United States Patent
Zimmer

(10) Patent No.: US 7,940,272 B2
(45) Date of Patent: *May 10, 2011

(54) SYSTEM AND METHOD FOR DISPLAYING TEXT

(75) Inventor: Mark Alan Zimmer, Aptos, CA (US)

(73) Assignee: Apple Inc., Cupterino, CA (US)

(*) Notice: Subject to any disclaimer, the term of this patent is extended or adjusted under 35 U.S.C. 154(b) by 70 days.

This patent is subject to a terminal disclaimer.

(21) Appl. No.: 11/620,574

(22) Filed: Jan. 5, 2007

(65) Prior Publication Data

US 2007/0132764 A1   Jun. 14, 2007

Related U.S. Application Data

(63) Continuation of application No. 10/601,821, filed on Jun. 22, 2003, now Pat. No. 7,271,805.

(51) Int. Cl.
*G06T 11/00* (2006.01)
*G09G 5/24* (2006.01)
*G06K 9/32* (2006.01)

(52) U.S. Cl. ..... 345/467; 345/468; 345/469; 345/469.1; 345/470; 382/298; 382/301

(58) Field of Classification Search ........... 345/467–471
See application file for complete search history.

(56) References Cited

U.S. PATENT DOCUMENTS

| | | | |
|---|---|---|---|
| 4,937,761 A | 6/1990 | Hassett | |
| 5,325,479 A | 6/1994 | Kaasila | |
| 5,579,416 A | 11/1996 | Shibuya et al. | |
| 6,288,725 B1 | 9/2001 | Fu | |
| 6,597,360 B1 | 7/2003 | Stamm et al. | |
| 6,760,029 B1 * | 7/2004 | Phinney et al. | 345/471 |
| 2004/0189643 A1 * | 9/2004 | Frisken et al. | 345/467 |
| 2005/0190187 A1 | 9/2005 | Salesin et al. | |

* cited by examiner

*Primary Examiner* — Xiao M Wu
*Assistant Examiner* — Tize Ma
(74) *Attorney, Agent, or Firm* — Schwegman, Lundberg & Woessner, P.A.

(57) ABSTRACT

A system and method for displaying text are described. According to embodiments of the invention, the system and methods describe operations for displaying text, where the text does not include hints.

14 Claims, 13 Drawing Sheets

SYSTEM AND METHOD FOR DISPLAYING TEXT

CROSS REFERENCE TO RELATED APPLICATIONS

This application is a continuation of U.S. application Ser. No. 10/601,821, filed on Jun. 22, 2003, now U.S. Pat. No. 7,271,805. This application claims the benefit of the filing date of U.S. application Ser. No. 10/601,821, filed on Jun. 22, 2003, now U.S. Pat. No. 7,271,805, the entire contents of which are herein incorporated by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to the field of fonts and more particularly to displaying text.

BACKGROUND

A font is a typeface style such as Arial, Times New Roman, or Courier. A font consists of a set of characters. For example, for a Roman font, these characters include upper and lower case characters, numbers, punctuation, and other symbols. Fonts also include text faces such as Regular, Bold, and Italic. Moreover, font text is displayed at a particular scale called a point size. In a computer, characters of a font are represented as glyphs. A glyph includes a set of points that defines straight lines and curves, which form the outline of a character.

Text is displayed on a computer monitor by converting a glyph into a bitmap raster through a process called rasterization. During the rasterization process, a glyph outline is filled to produce a bitmap raster. The bitmap raster is displayed by imprinting it onto the computer monitor's backing store, which implicitly displays the bitmap raster on the computer monitor at a high duty cycle. The process of imprinting a bitmap raster onto the computer monitor's backing store is called blitting. Depending on the computer system, a bitmap raster may be imprinted into a window's backing store, and then imprinted onto the monitor's backing store.

Some fonts include "hints," which are used when font characters are displayed on a computer monitor. In addition to information representing the outline of a character, glyphs of a hinted font include information about scaling the character for different resolutions. In particular, hints describe a font's stems and bowls that should be snapped to pixel boundaries. Hinting is typically used when rasterizing a glyph to a purely black and white bitmap. Hinting can also be used to increase the contrast of grayscale glyph bitmaps. Hints are added to a font when the font is designed. For example, typically, font designers must determine rules for fitting each character of a font into a grid to obtain quality raster characters. The grid fitting rules (also called hints) typically apply to character stems, bowls, and serifs. Thus, the process of adding hints to a font increases the time for designing a font. As a result, many fonts do not include hints. Because many fonts are designed without hints, it can be difficult to align key parts of character glyphs to achieve relatively high contrast, when displaying fonts on a computer monitor.

SUMMARY

A system and method for displaying text is described. In one embodiment, the method includes receiving character outline data, wherein the character outline data includes a set of points. The method further includes determining original interval boundaries based on the character outline data, creating modified interval boundaries to correspond to pixel boundaries, wherein each of the modified interval boundaries is a distance from one of the original interval boundaries. The method further includes vertically repositioning certain points of the set of points based on the distances.

BRIEF DESCRIPTION OF THE FIGURES

The present invention is illustrated by way of example and not limitation in the Figures of the accompanying drawings, in which like references indicate similar elements and in which.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams.

This description of the embodiments is divided into four sections. In the first section, an exemplary hardware and operating environment is described. In the second section, a system level overview is presented. In the third section, methods for using exemplary embodiments are described. In the fourth section, an exemplary implementation is described.

Hardware and Operating Environment

This section provides an overview of the exemplary hardware and the operating environment in which embodiments of the invention can be practiced.

Figure 1:
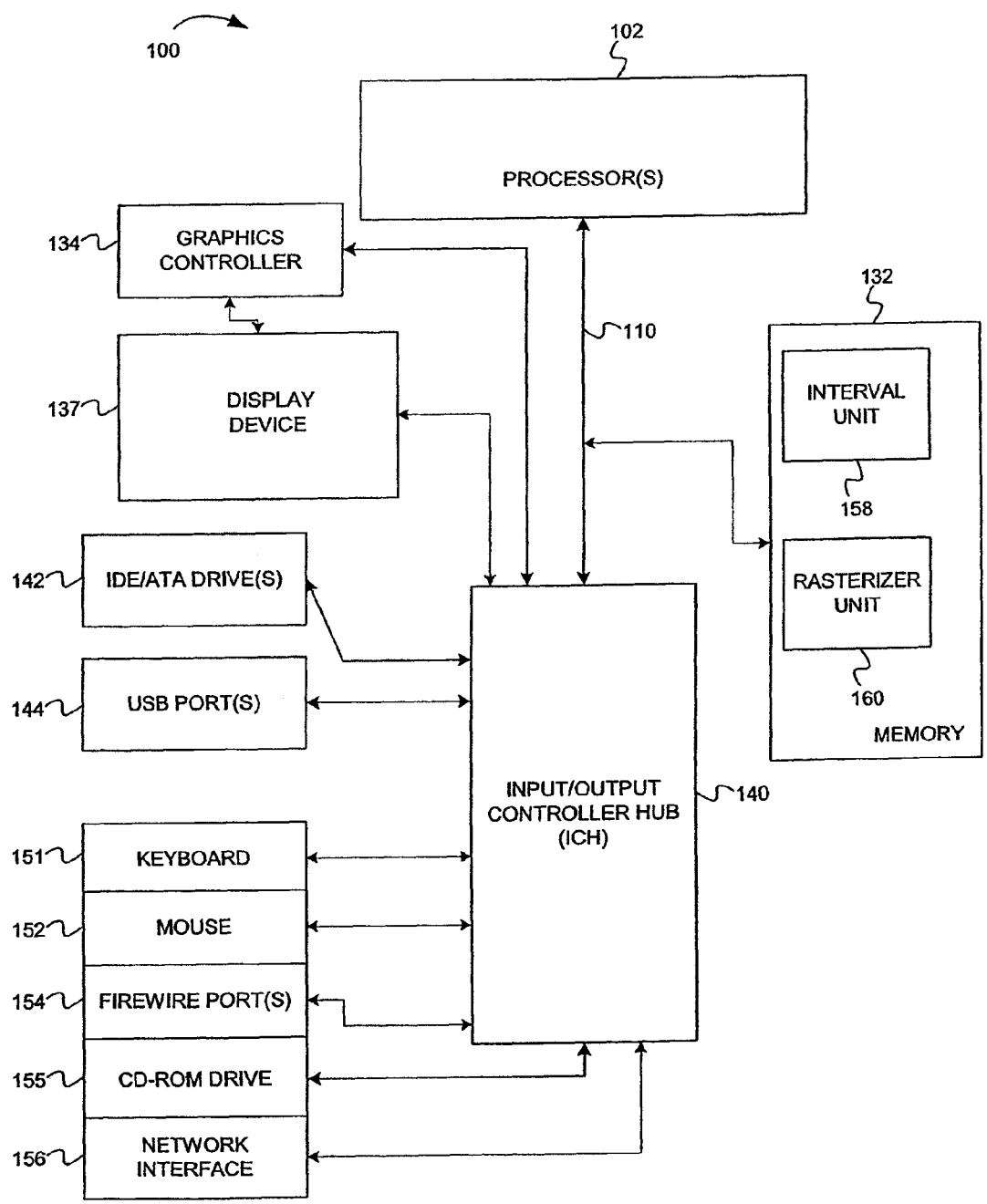
FIG. 1 illustrates an exemplary computer system used in conjunction with certain embodiments of the invention.

FIG. 1 illustrates an exemplary computer system used in conjunction with certain embodiments of the invention. As illustrated in FIG. 1, computer system 100 comprises processor(s) 102. Computer system 100 also includes a memory 132, processor bus 110, and input/output controller hub (ICH) 140. The processor(s) 102, memory 132, and ICH 140 are coupled to the processor bus 110. The processor(s) 102 may comprise any suitable processor architecture. The computer system 100 may comprise one, two, three, or more processors, any of which may execute a set of instructions in accordance with embodiments of the present invention.

The memory 132 stores data and/or instructions, and may comprise any suitable memory, such as a dynamic random access memory (DRAM), for example. The computer system 100 also includes IDE drive(s) 142 and/or other suitable storage devices. A graphics controller 134 controls the display of information on a display device 137, according to embodiments of the invention.

The input/output controller hub (ICH) 140 provides an interface to I/O devices or peripheral components for the computer system 100. The ICH 140 may comprise any suitable interface controller to provide for any suitable communication link to the processor(s) 102, memory 132 and/or to any suitable device or component in communication with the ICH 140. For one embodiment of the invention, the ICH 140 provides suitable arbitration and buffering for each interface.

For one embodiment of the invention, the ICH 140 provides an interface to one or more suitable integrated drive electronics (IDE) drives 142, such as a hard disk drive (HDD) or compact disc read only memory (CD ROM) drive, or to suitable universal serial bus (USB) devices through one or more USB ports 144. For one embodiment, the ICH 140 also provides an interface to a keyboard 151, a mouse 152, a CD-ROM drive 155, and one or more suitable devices through one or more firewire ports 154. For one embodiment of the invention, the ICH 140 also provides a network interface 156 though which the computer system 100 can communicate with other computers and/or devices.

In one embodiment, the computer system 100 includes a machine-readable medium that stores a set of instructions (e.g., software) embodying any one, or all, of the methodologies described herein. Furthermore, software can reside, completely or at least partially, within memory 132 and/or within the processor(s) 102. In one embodiment, the memory 132 includes an interval unit 158, a vertical repositioning unit 159, and a rasterizer unit 160.

System Level Overview

Figure 2:
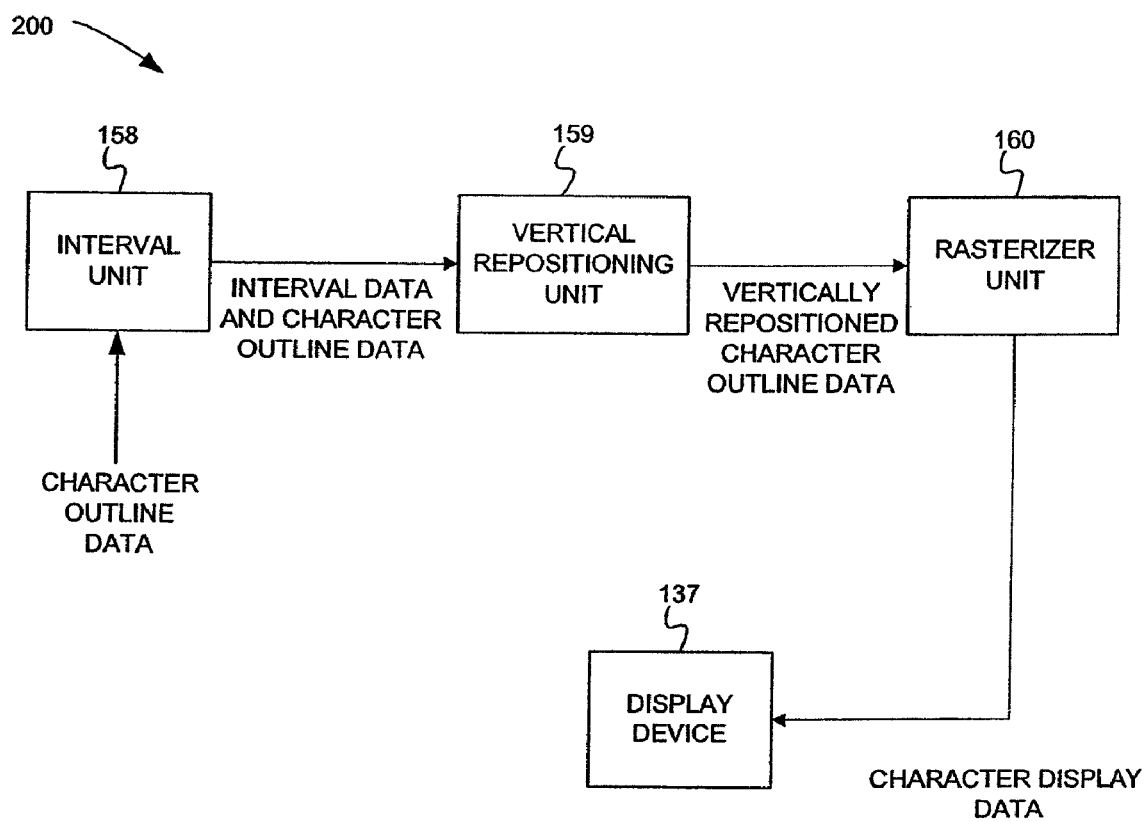
FIG. 2 is a data flow diagram illustrating the flow of data through functional units of a text display system, according to exemplary embodiments of the invention.
Figure 3:
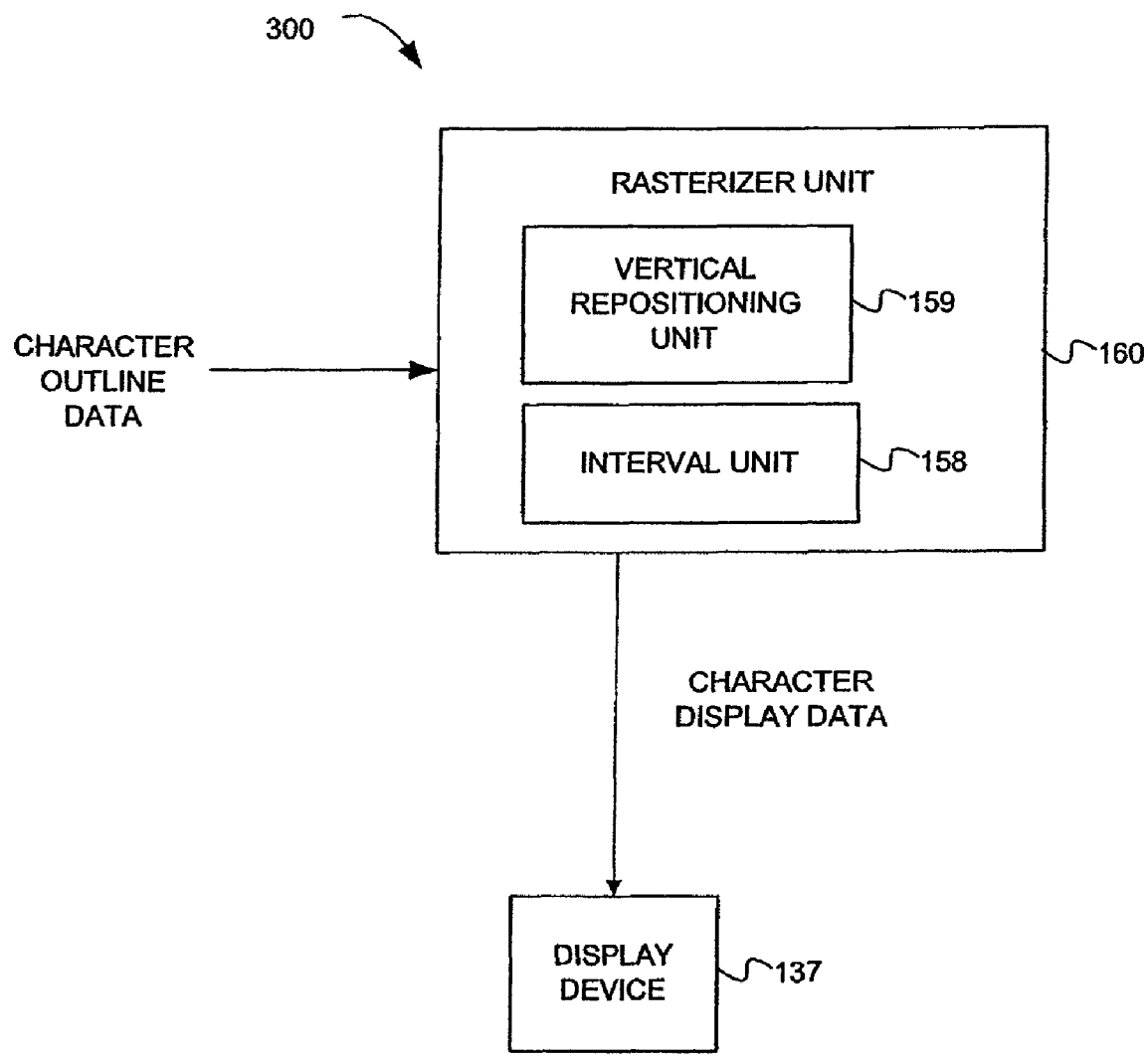
FIG. 3 illustrates an alternative layout and data flow of the text display system shown in FIG. 2, according to exemplary embodiments of the invention.
Figure 4:
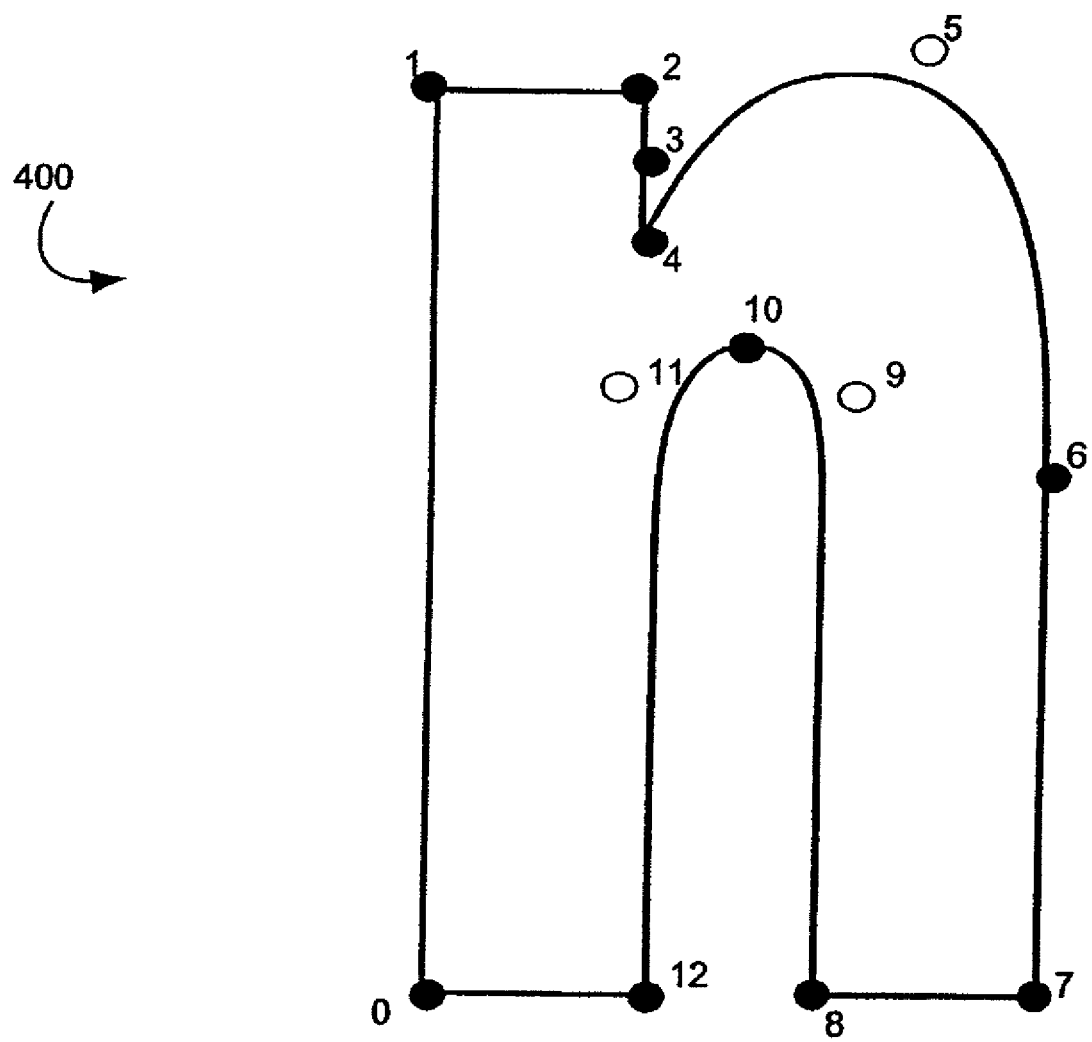
FIG. 4 illustrates character outline data used for representing a character, according to exemplary embodiments of the invention.

This section provides a system level overview of exemplary embodiments of the invention. FIGS. 2-3 describe layouts of and data flow between functional units of a text display system. FIGS. 4-5 describe a data type used for representing characters in the text display system. Operations for the functional units are described in the next section.

FIG. 2 is a data flow diagram illustrating the flow of data through functional units of a text display system, according to exemplary embodiments of the invention. As shown in FIG. 2, the text display system 200 includes an interval unit 158, which is connected to a vertical repositioning unit 159. The vertical repositioning unit 159 is connected to a rasterizer unit 160. Also as shown in FIG. 2, the rasterizer unit 160 is connected to a display device 137.

In one embodiment, the interval unit 158 receives character outline data from a data store (e.g., a CD ROM drive 155 or memory 132). In an alternative embodiment, the interval unit 158 receives character outline data from a network connection (e.g., network interface 156) or other suitable data source. The interval unit 158 transmits interval data and the character outline data to the vertical repositioning unit 159, which transmits vertically repositioned character outline data to the rasterizer unit 160. In one embodiment, the interval data includes a set of original interval boundaries and a set of modified interval boundaries. In an alternative embodiment, the interval data includes a set of original breakpoints and a set of modified breakpoints. Interval boundaries and breakpoints are discussed in greater detail below (see FIG. 10). In one embodiment the character outline data includes a glyph, as described below in the discussion of FIG. 4.

As shown in FIG. 2, the rasterizer unit 160 transmits character display data to the display device 137. Operations for vertically repositioning the character outline data are described below (see FIG. 13).

FIG. 3 illustrates an alternative layout and data flow of the text display system shown in FIG. 2, according to exemplary embodiments of the invention. As shown in FIG. 3, the text display system 300 includes a rasterizer unit 160, which includes an interval unit 158 and a vertical repositioning unit 159. The rasterizer unit 160 receives character outline data from a data source, while it transmits character display data to the display device 137. According to alternative embodiments of the invention, the interval unit 158 and vertical repositioning unit 159 are integrated with the rasterizer unit 160, as shown in FIG. 3, or subdivided into any suitable number of separate units. In one embodiment, the interval unit 158 and the rasterizer unit 160 exchange data over a bus. Alternatively, the interval unit 158, the vertical repositioning unit 159 and the rasterizer unit 160 exchange data via interprocess communication, message passing, or any other suitable communication technique.

While FIGS. 2-3 describe layouts and data flows for the text display system, FIGS. 4-5 describe a data type for representing characters. FIG. 4 illustrates character outline data used for representing a character, according to exemplary embodiments of the invention. As described in FIG. 4, character outline data 400 includes a set of points, which represents a character outline. In one embodiment, the character outline data is a glyph. As shown in FIG. 4, a character outline of a lowercase 'n' is represented by a set of points. The set of points includes points 0, 1, 2, 3, 4, 5, 6, 7, 8, 9, 10, 11, and 12, which define various line segments and curves that make up the lowercase 'n' outline. Points 5, 9, and 11 are control points, while points 0, 1, 2, 3, 4, 6, 7, 8, 10, and 12 are endpoints. Control and end points are described in greater detail in the discussion of FIG. 5. Rules for defining the line segments and curves are discussed below, with reference to FIG. 5.

Figure 5A:
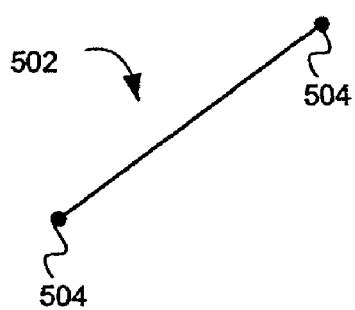
FIGS. 5A, 5B, and 5C illustrate a set of curves used for representing character outline data, according to exemplary embodiments of the invention.
Figure 5B:
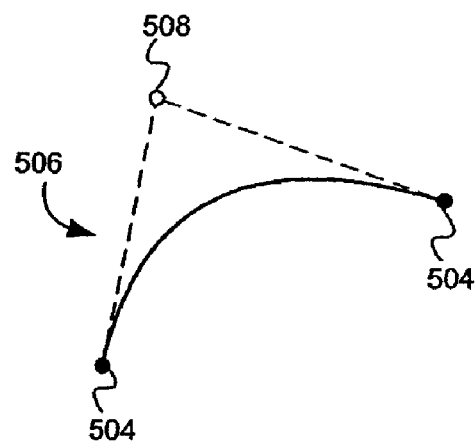
Figure 5C:
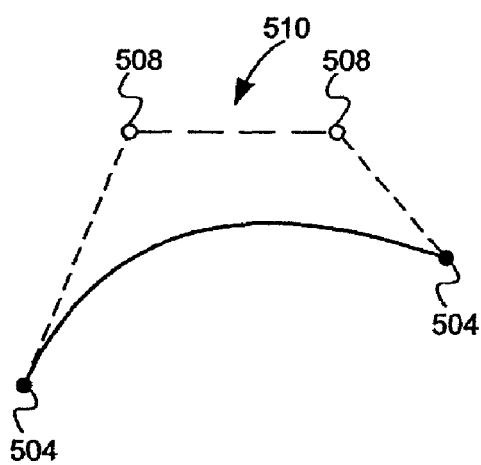

FIGS. 5A, 5B, and 5C illustrate a set of curves used for representing character outline data, according to exemplary embodiments of the invention. As noted above, character outline data includes a set of points, which defines lines and curves that make up a character outline. As shown in FIG. 5A, two end points 504 define a line segment 502. In FIG. 5A, the end points 504 are illustrated as solid points. FIG. 5B shows a quadratic curve 506, which is defined by two end points 504 and a control point 508. The control points, such as point 508, are illustrated as unfilled points. Control points 508 are used to form various curves including quadratic and cubic curves. For example, in FIG. 5C, a cubic curve 510 is defined by two control points 508 and two end points 504. Curves and line segments similar to those shown in FIG. 5 can be combined in character outline data to represent a character of a font.

Methods of the Invention

This section describes methods performed by embodiments of the invention. In certain embodiments, the methods are performed by instructions stored on machine-readable media (e.g., software), while in other embodiments, the methods are performed by hardware or other logic (e.g., digital logic). Moreover, according to some embodiments of the invention, the methods described herein are performed by operating system programs. In one embodiment, the operating system program is a MacIntosh operating system. According to alternative embodiments, the methods are performed by application programs. Some application programs include, but are not limited to word processing programs, web browsing programs, contact manager programs, email programs, calendar programs, presentation programs, and desktop publishing programs. Embodiments of the invention are not limited to the example operating system and application programs listed above. Any operating system program or application program that controls the display of text is within the scope of this invention.

Figure 6:
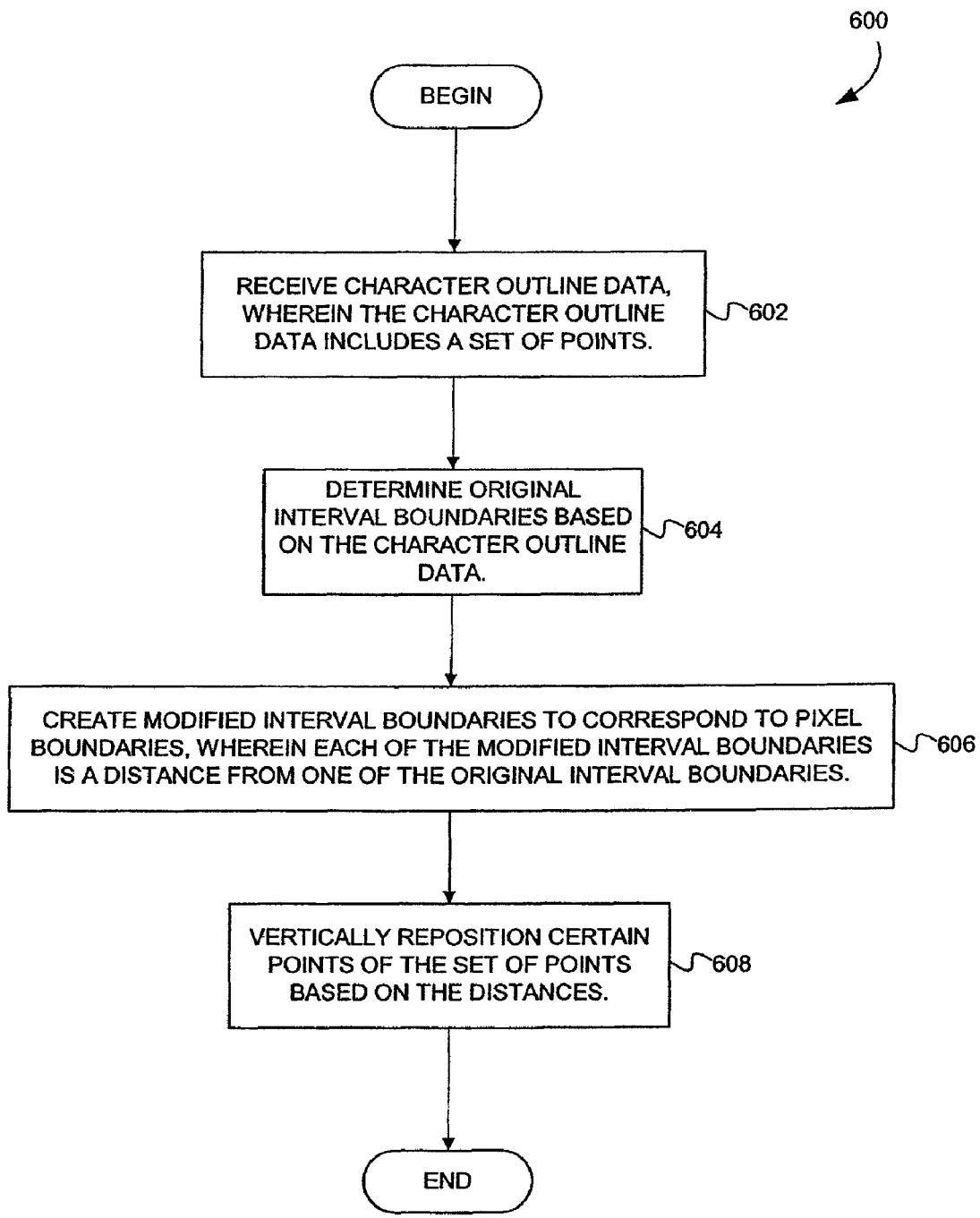
FIG. 6 is a flow diagram illustrating operations for vertically repositioning character outline data, according to exemplary embodiments of the invention.
Figure 7:
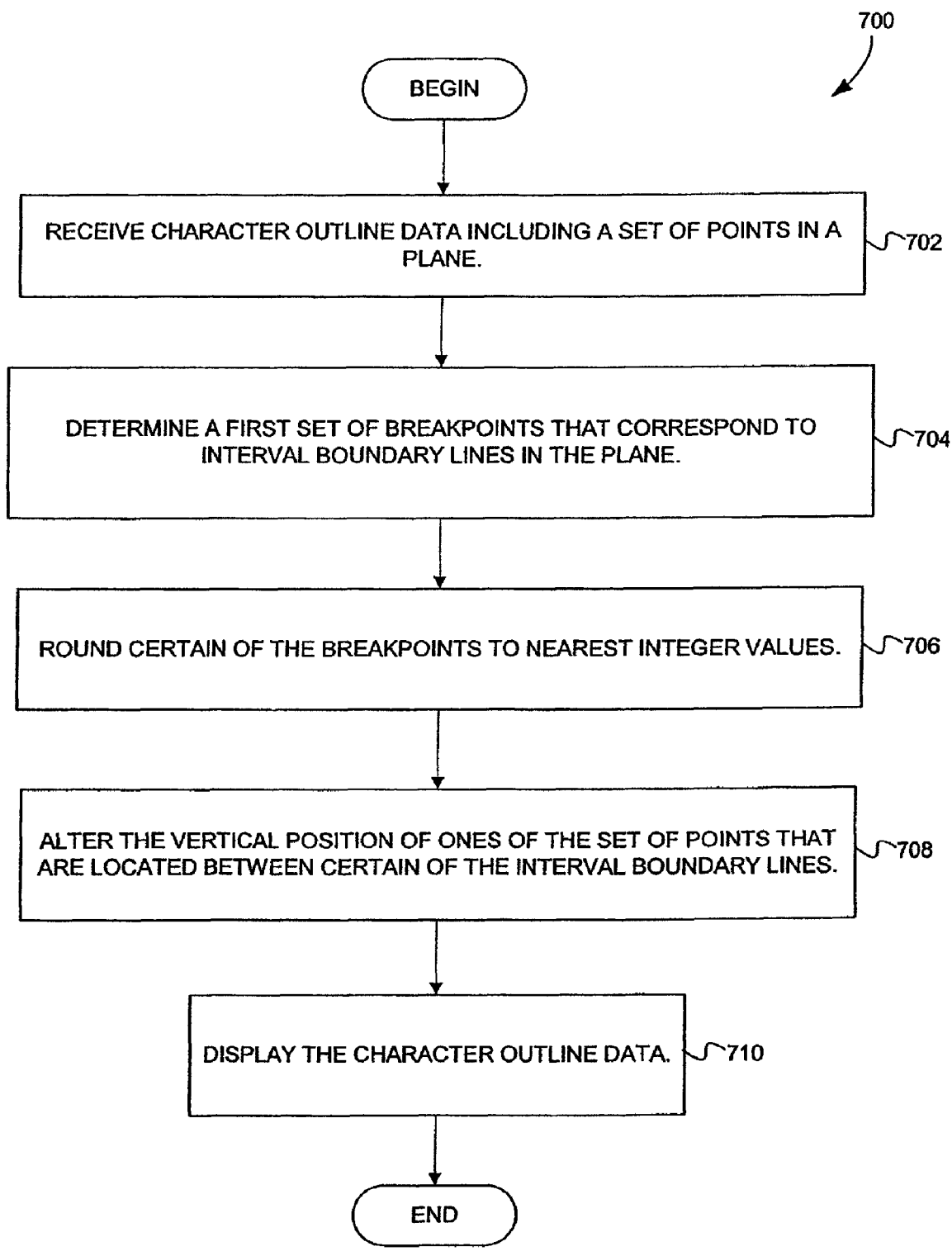
FIG. 7 is a flow diagram illustrating operations for determining breakpoints and vertically repositioning character outline data based on the breakpoints, according to the exemplary embodiments of the invention.
Figure 8:
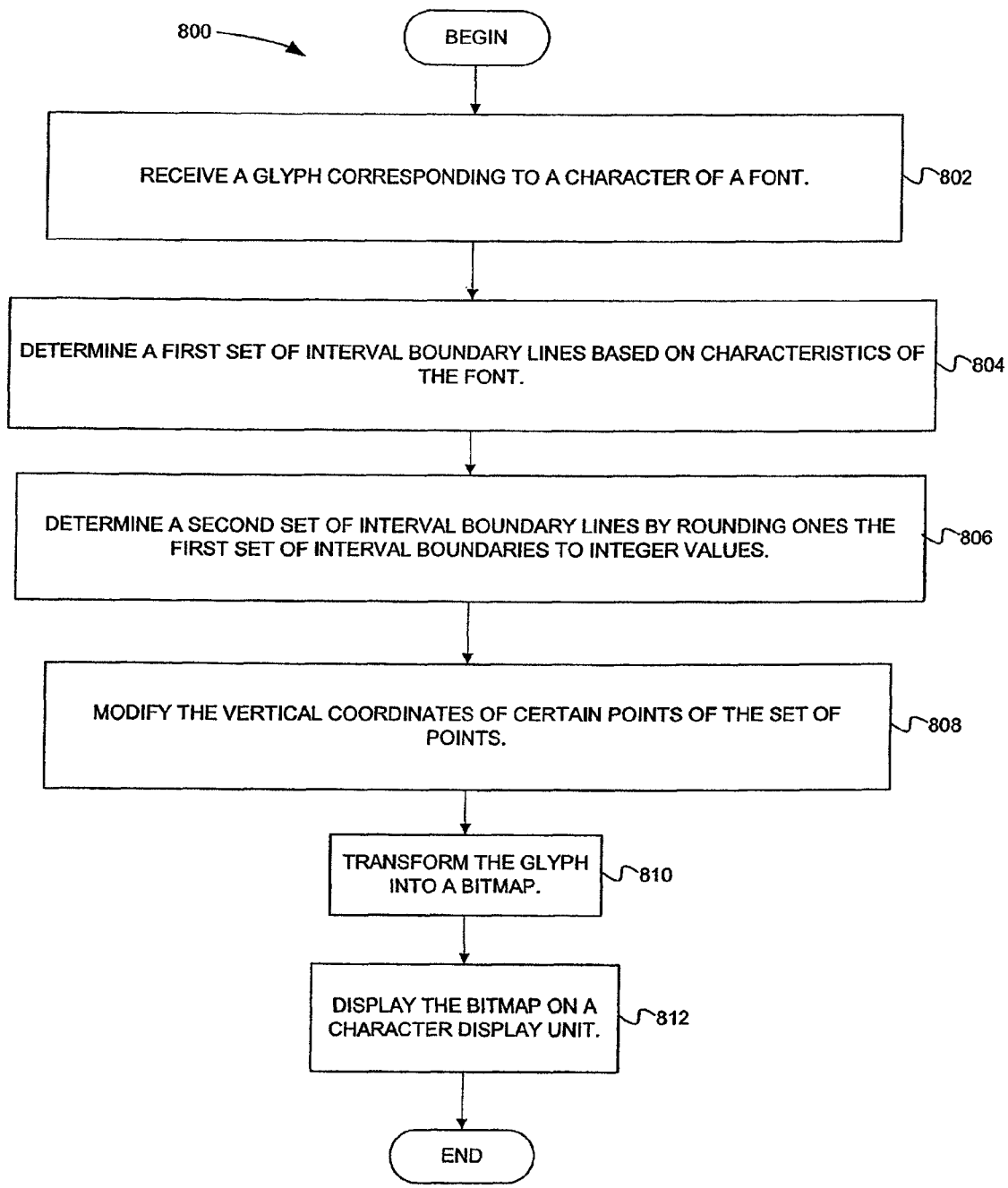
FIG. 8 is a flow diagram illustrating operations for receiving, vertically repositioning, and displaying a glyph, according to exemplary embodiments of the invention.

In this section, FIGS. 6-8 will be discussed. FIGS. 6-8 describe operations for receiving and repositioning character outline data so that characters appear with sharp contrast on a display device. In particular, FIG. 6 describes operations for vertically repositioning character outline data relative to interval boundaries, while FIG. 7 describes operations for vertically repositioning character data relative to breakpoints. FIG. 8 describes similar operations for vertically repositioning a glyph. Interval boundaries and breakpoints are described in greater detail in the next section, with reference to FIG. 10. After the character outline data or a glyph is vertically repositioned, a character can be displayed at a relatively high contrast for a given resolution on a display device.

FIG. 6 is a flow diagram illustrating operations for vertically repositioning character outline data, according to exemplary embodiments of the invention. The flow diagram 600 will be described with reference to the exemplary text display system shown in FIG. 2. The flow diagram 600 commences at block 602, where character outline data including a set of points is received. For example, referring to the exemplary embodiment of FIG. 2, the interval unit 158 receives character data including a set of points. The flow continues at block 604.

At block 604, original interval boundaries are determined based on the character outline data. For example, the interval unit 158 determines interval boundaries based on the character outline data. The process continues at block 606.

At block 606, modified interval boundaries are created to correspond to pixel boundaries, wherein each of the modified interval boundaries is a distance from one of the original interval boundaries. For example, the interval unit 158 creates modified interval boundaries to correspond to pixel boundaries, wherein each of the modified interval boundaries is a distance from one of the original interval boundaries. The process continues at block 608.

At block 608, certain points of the set of points are vertically repositioned based on the distances. For example, the vertical repositioning unit 159 vertically repositions certain points of the set of points based on the distances. From block 608, the process ends.

FIG. 7 is a flow diagram illustrating operations for determining breakpoints and vertically repositioning character outline data based on the breakpoints, according to the exemplary embodiments of the invention. The flow diagram 700 will be described with reference to the exemplary text display system shown in FIG. 2. The flow diagram 700 commences at block 702, where character outline data including a set of points in a plane is received. For example, the interval unit 158 receives character outline data including a set of points in a plane, wherein the set of points represents a character of a font. The process continues at block 704.

At block 704, a first set of breakpoints that correspond to interval boundary lines in a plane is determined based on characteristics of the font. For example, the interval unit 158 determines a first set of breakpoints that correspond to interval boundary lines in a plane, and wherein each breakpoint is determined based on characteristics of the font. The process continues at block 706.

As shown in block 706, certain of the breakpoints are rounded to the nearest integer values. For example, the interval unit 158 rounds certain of the breakpoints to the nearest integer values. The process continues at block 708.

At block 708, the vertical position of ones of the set of points that are located between certain of the interval boundary lines are altered. For example, the vertical repositioning unit 159 alters the vertical position of ones of the set of points that are located between certain of the interval boundary lines. The process continues at block 710.

As shown at block 710, the character outline data is displayed. For example, the display device 137 displays the character outline data. From block 710, the process ends.

While FIGS. 6 and 7 describe operations for vertically repositioning character outline data, FIG. 8 describes similar operations where the character outline data is a glyph. FIG. 8 is a flow diagram illustrating operations for receiving, vertically repositioning, and displaying a glyph, according to exemplary embodiments of the invention. The flow diagram 800 commences at block 802.

At block 802, a glyph corresponding to a character of a font is received. The glyph includes a set of points and each of the set of points includes a vertical coordinate and a horizontal coordinate. For example, the interval unit 158 receives a glyph corresponding to a character of a font. The flow continues at block 804.

At block 804, a first set of interval boundary lines based on characteristics of the font is determined. In one embodiment, the characteristics include a distance from a top of a lowercase character to a baseline and a distance from a top of an uppercase character to a baseline. For example, the interval unit 158 determines a first set of interval boundary lines based on characteristics of the font. The process continues at block 806.

As shown in block 806, a second set of interval boundary lines is determined by rounding ones of the first set of interval boundaries to integer values. In one embodiment, the integer values correspond to pixel boundaries of a character display unit. For example, the interval unit 158 determines a second set of interval boundary lines by rounding ones the first set of interval boundaries to integer values. The process continues at block 808.

At block 808, the vertical coordinates of certain points of the set of points are modified. The modification moves the certain points to locations relative to ones of the second set of interval boundary lines. For example, the vertical repositioning unit 159 modifies the vertical coordinates of certain points of the set of points. The process continues at block 810.

At block 810, the glyph is transformed into a bitmap. For example, the rasterizer 160 transforms the glyph into a bitmap. The process continues at block 814.

As shown in block 812, the bitmap is displayed. For example, the display unit 137 displays the bitmap. From block 812, the process ends.

Exemplary Implementation

Figure 9:
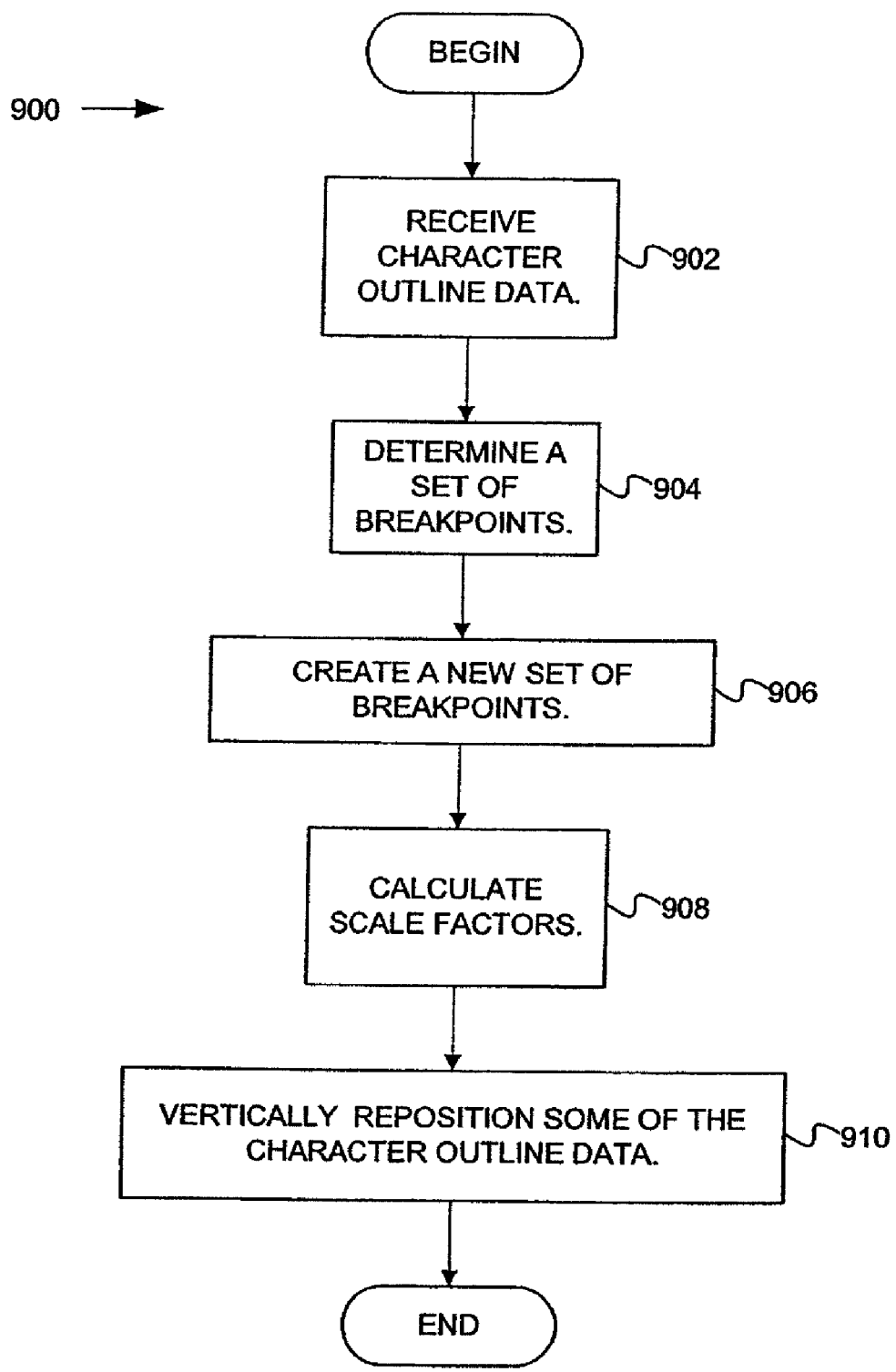
FIG. 9 is a flow diagram illustrating operations for vertically repositioning character outline data, according to exemplary embodiments of the invention.

This section describes the exemplary embodiments in greater detail. In this section, FIGS. 9-13 will be presented. FIG. 9 generally describes operations for vertically repositioning character outline data. FIGS. 10-13 describe the operations of FIG. 9 in greater detail.

FIG. 9 is a flow diagram illustrating operations for vertically repositioning character outline data, according to exemplary embodiments of the invention. In one embodiment, the operations of FIG. 9 are preferably performed with text point sizes ranging from 7 point to 19 point. However embodiments of the invention are not limited to text point sizes ranging from 7 point to 19 point. In alternative embodiments, the method is used with other point sizes both above and below this range.

The flow diagram 900 commences at block 902, where character outline data is received. For example, referring to FIG. 2, the interval unit 158 receives character outline data. In one embodiment, the character outline data is a glyph including a set of points defining curves and lines, which make up a character outline. In an alternative embodiment, the character outline data includes a set of points and additional general font information. For example, general font information includes but is not limited to a distance from a top of a lowercase character (e.g., a lowercase 'o') to a baseline and a distance from a top of an uppercase character (e.g., an uppercase 'X') to a baseline (see FIG. 10 for more detail). The process continues at block 904.

At block 904, a set of breakpoints is determined. In one embodiment, breakpoints correspond to interval boundaries along the y axis of an x-y plane, as described in greater detail below (See FIG. 10). For example, the interval unit 158 determines a set of breakpoints. A method for determining a set of breakpoints is described in greater detail below, with reference to FIG. 10. The process continues at block 906.

As shown in block 906, a new set of breakpoints is created. For example, the interval unit 158 creates a new set of breakpoints. Operations for creating a new set of breakpoints are described below, with reference to FIG. 11. The process continues at block 908.

As shown in block 908, scale factors are calculated. In one embodiment, scale factors are scalar values used for repositioning points of the character outline data. For example, the interval unit 158 calculates scale factors. Operations for calculating scale factors are described in greater detail below, with reference to FIG. 12. The process continues at block 910.

At block 910, some of the character outline data is vertically repositioned. For example, the vertical repositioning unit 159 vertically repositions some of the character outline data. In one embodiment, the character outline data is vertically repositioned based on a stepwise linear transform in y, in an x-y plane. Operations for vertically repositioning some of the character outline data are described below, with reference to FIG. 13. From block 910, the process ends.

Figure 10:
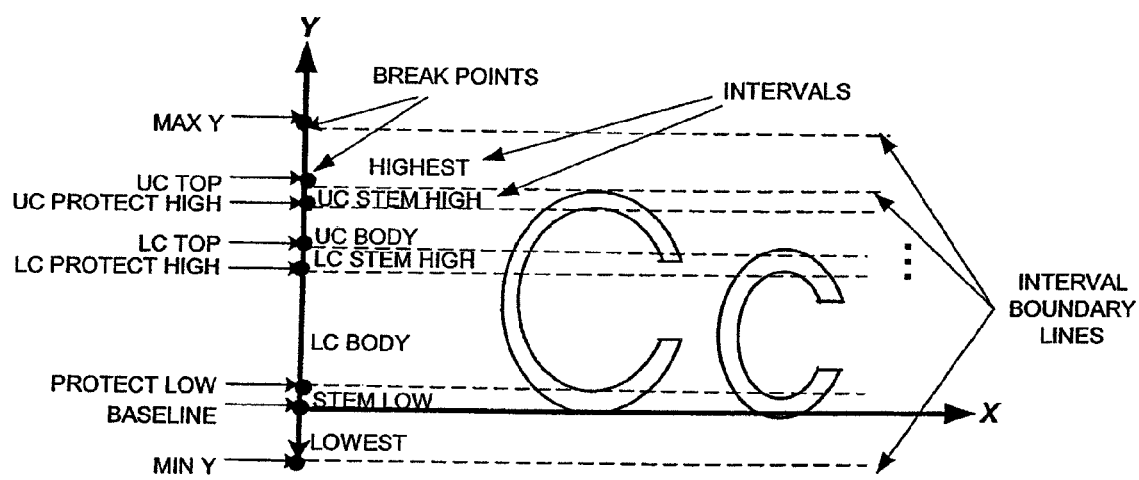
FIG. 10 is a diagram illustrating relationships between breakpoints, interval boundary lines, and intervals, according to embodiments of the invention.

As noted above, FIG. 10 describes operations for determining breakpoints, as recited at block 904 of FIG. 9, in greater detail. FIG. 10 is a diagram illustrating relationships between breakpoints, interval boundary lines, and intervals, according to exemplary embodiments of the invention. FIG. 10 shows a two-dimensional x-y plane including a number of breakpoints, which correspond with a number of interval boundary lines. The interval boundary lines (also called interval boundaries) are represented by broken lines running parallel to the x axis. The breakpoints, which correspond to the interval boundary lines, are represented by points on the y axis. The interval boundary lines and the breakpoints are specified to bound intervals along the y axis. Each of the breakpoints and corresponding interval boundary lines has been assigned a name to clarify its relationship to characters of a font, which may be represented by character outline data or glyphs, according to embodiments of the invention. For example, the following names have been given to breakpoints and their corresponding interval boundary lines: Max Y, UC Top, UC Protect High, LC Top, LC Protect High, Protect Low, Baseline, and Min Y.

The Max Y breakpoint and corresponding interval boundary line define the highest y value of all characters in a font, according to embodiments of the invention.

The UC Top breakpoint and corresponding interval boundary line define the cap-height of the font above the baseline. The cap-height corresponds to the height that specifies the top of the upper case characters, not including the overshoot of rounded upper-case characters. In one embodiment, the UC Top value is determined by computing the top (maximum y value) of the uppercase 'X' character.

The UC Protect High breakpoint and corresponding boundary line are below UC Top by an amount that approximates the thickness of stems at the top of uppercase letters, such as uppercase 'B' and 'D', according to embodiments of the invention. In one embodiment, horizontal stem thickness is estimated at the minimum of ⅓ of the lower-case height and ½ the difference between the uppercase and lowercase heights. In one embodiment, the horizontal stem thickness need only be an approximate value.

The LC Top breakpoint and corresponding boundary line define the height of the font above the baseline plus a lowercase overshoot. In one embodiment, the LC Top value is determined by computing the top (i.e., the maximum y value) of the lowercase 'o' character.

The LC Protect High breakpoint and corresponding interval boundary line are below LC Top by an amount that approximates the thickness of the stems at the top of lowercase letters, such as lowercase 'c' and 'o', according to embodiments of the invention.

The Protect Low breakpoint and corresponding interval boundary line are above the baseline (i.e., the x axis) by an amount that approximates the thickness of the stems at the bottom of uppercase letters, such as uppercase 'B' and 'D', according to embodiments of the invention.

The Baseline breakpoint and corresponding interval boundary line correspond with the x axis, according to embodiments of the invention.

The Min Y breakpoint and corresponding boundary line define the lowest y value of all characters in the font, according to embodiments of the invention.

Similar to the breakpoints and boundary lines, names have been assigned to the intervals to aid in performing the methods of FIGS. 9-13. In particular, from top to bottom, the intervals are Highest, UC Stem High, UC Body, LC Stem High, LC Body, Stem Low, and Lowest.

These breakpoints and intervals are to be determined for a given font family, font face, and a font point size. Once breakpoints and intervals are determined for a font family, font face, and font point size, they can be reused in the future.

Figure 11:
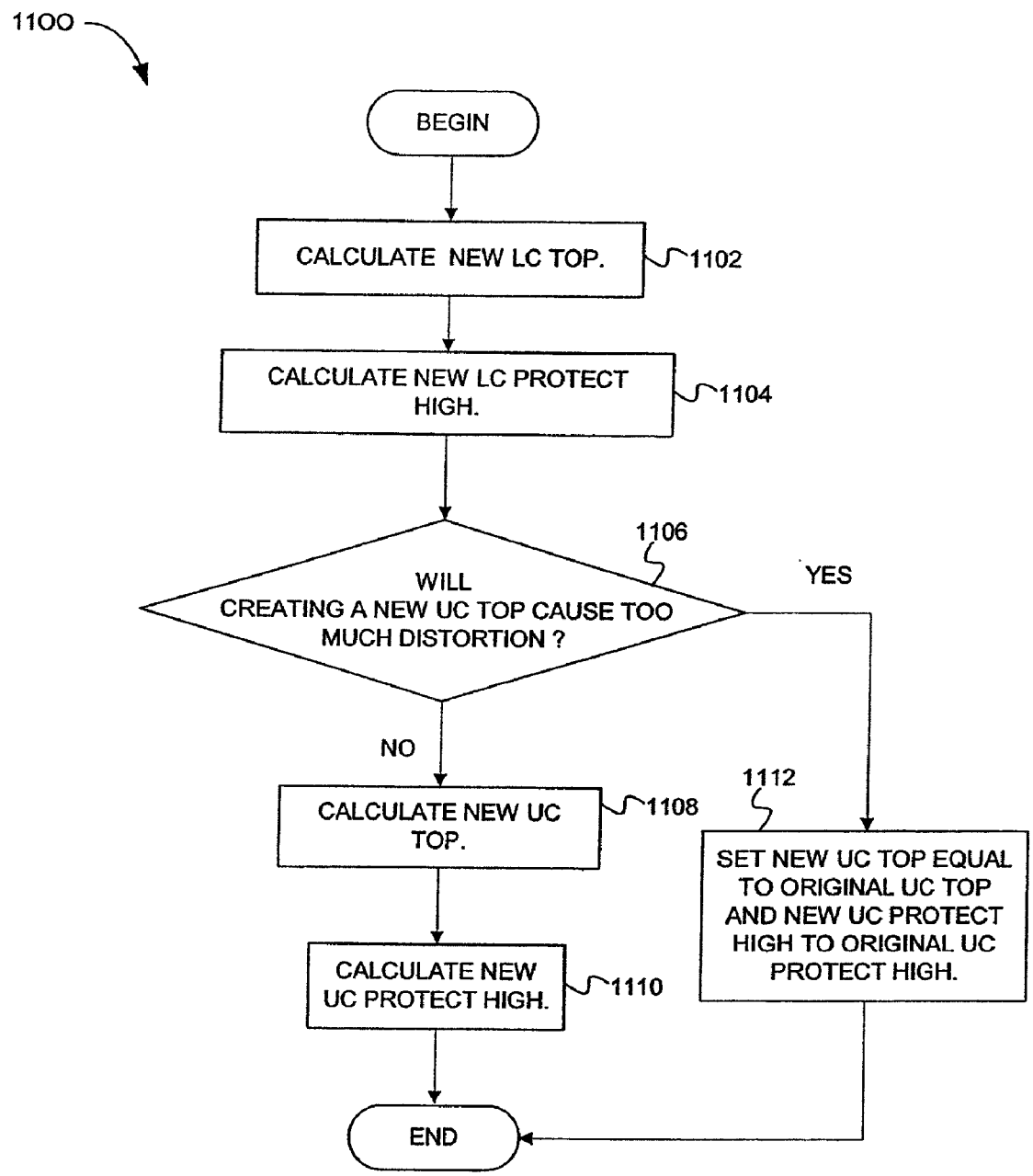
FIG. 11 is a more detailed flow diagram of the method for creating a new set of breakpoints, as shown in block 906 of FIG. 9, according to exemplary embodiments of the invention.

As noted above, FIG. 11 describes operations for creating a new set of breakpoints, as recited in block 906 of FIG. 9. FIG. 11 is a flow diagram illustrating operations for creating a new set of breakpoints, according to exemplary embodiments of the invention. The operations of the flow diagram 1100 will be described with reference to the exemplary text display system shown in FIG. 2. The flow diagram 1100 commences at block 1102, where New LC Top is calculated. For example, the interval unit 158 calculates New LC Top. In one embodiment, the New LC Top is the original LC Top rounded to the nearest integer value. The process continues at block 1104.

At block 1104, New LC Protect High is calculated. For example, the interval unit 158 calculates New LC Protect High. In one embodiment, New LC Protect High is the original LC Protect High+(New LC Top−original LC Top). The process continues at block 1106.

As shown in block 1106, it is determined whether creating a New UC Top would cause too much distortion to the character outline data. In one embodiment, there is too much distortion if (LC Top/UC Top)/(New LC Top/New UC Top) <¾. In another embodiment, there is too much distortion if (LC Top/UC Top)/(New LC Top/New UC Top)>4/3. In alternative embodiments, (LC Top/UC Top)/(New LC Top/New UC Top) is compared to other ratios for determining whether there is too much distortion. In yet another embodiment, there is too much distortion if (New UC Protect High−New LC Top)/(UC Protect High−LC Top)<¾ or (New UC Protect High−New LC Top)/(UC Protect High−LC Top)−(New LC Protect High−Protect Low)/(LC Protect High−Protect Low) >3/10. If there would be too much distortion, the process continues at block 1112. Otherwise, the process continues at block 1108.

At block 1112, New UC Top is set equal to the original UC Top and New LC Protect High is set equal to the original LC Protect High. For example the interval unit 158 sets New UC Top to the original UC Top and New LC Protect High to the original LC Protect High. From block 1112, the process ends.

As shown in block 1108, new UC Top is calculated. In one embodiment, New UC Top is the original UC Top rounded to the nearest integer value. The process continues at block 1110.

At block 1110, a new value for UC Protect High is calculated. For example, the interval unit 158 calculates New UC Protect High. In one embodiment, New UC Protect High is the original UC Protect High+(New UC Top−original UC Top). From block 1110, the process ends.

Referring to the operations above, according to one embodiment, the adjustment of LC Top has the effect of increasing the contrast at the tops of all lower-case text by eliminating unnecessary fringe grayscale pixels. Additionally, the corresponding adjustment of LC Protect High has the effect of preserving the thickness of stems at the top of all lower-case characters, according to embodiments of the invention. When New UC Top is assigned a value other than the original UC Top, contrast is increased at the tops of all uppercase text by eliminating unnecessary fringe grayscale pixels. The corresponding adjustment of UC Protect High has the effect of preserving the thickness of stems at the top of all upper-case characters, when New UC Protect High is assigned a value other than UC Protect High.

Figure 12:
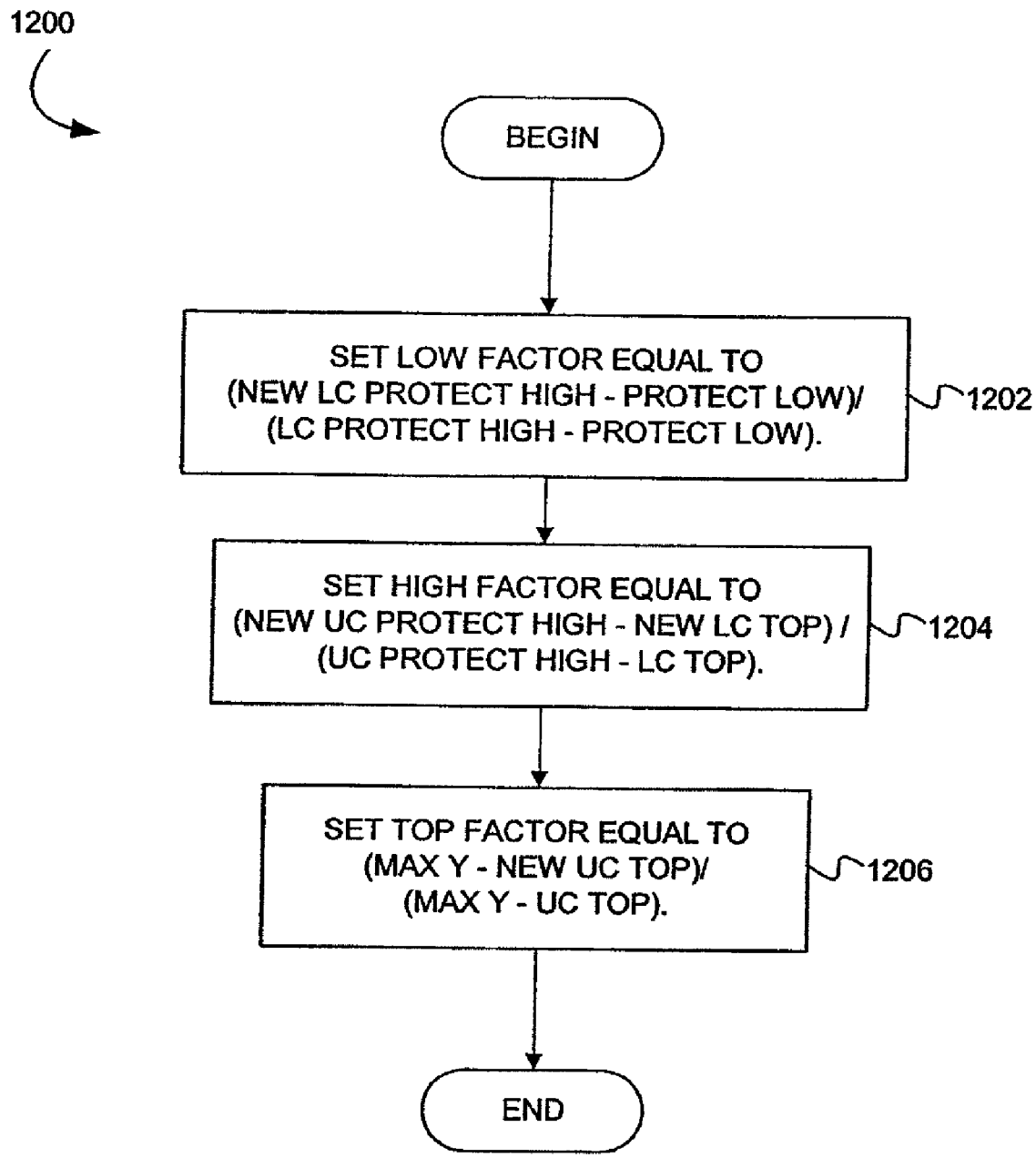
FIG. 12 is a more detailed flow diagram of the method of calculating scale factors, as shown in block 908 of FIG. 9, according to exemplary embodiments of the invention.

As indicated above, FIG. 12 describes calculating scale factors, as recited at block 908 of FIG. 9. FIG. 12 is a flow diagram illustrating operations for calculating scale factors, according to exemplary embodiments of the invention. The flow diagram 1200 will be described with reference to exemplary text display system of FIG. 2. The flow diagram 1200 commences at block 1202, where Low Factor is set equal to (New LC Protect High−Protect Low)/(LC Protect High−Protect Low). For example, the interval unit 158 sets Low Factor equal to (New LC Protect High−Protect Low)/(LC Protect High−Protect Low). The process continues at block 1204.

At block 1204, High Factor is set equal to (New UC Protect High−New LC Top)/(UC Protect High−LC Top). For example, the interval unit 158 sets High Factor equal to (New UC Protect High−New LC Top)/(UC Protect High−LC Top). The process continues at block 1206.

As shown in block 1206, Top Factor is set equal to (Max Y−New UC Top)/(Max Y−UC Top). For example, the interval unit 158 sets Top Factor equal to (Max Y−New UC Top)/(Max Y−UC Top). From 1206, the process ends.

Like FIGS. 10-12, FIG. 13 describes operations of FIG. 9 in greater detail. In particular, FIG. 13 describes operations for vertically repositioning some of the character outline data, as recited in block 910 of FIG. 9.

Figure 13:
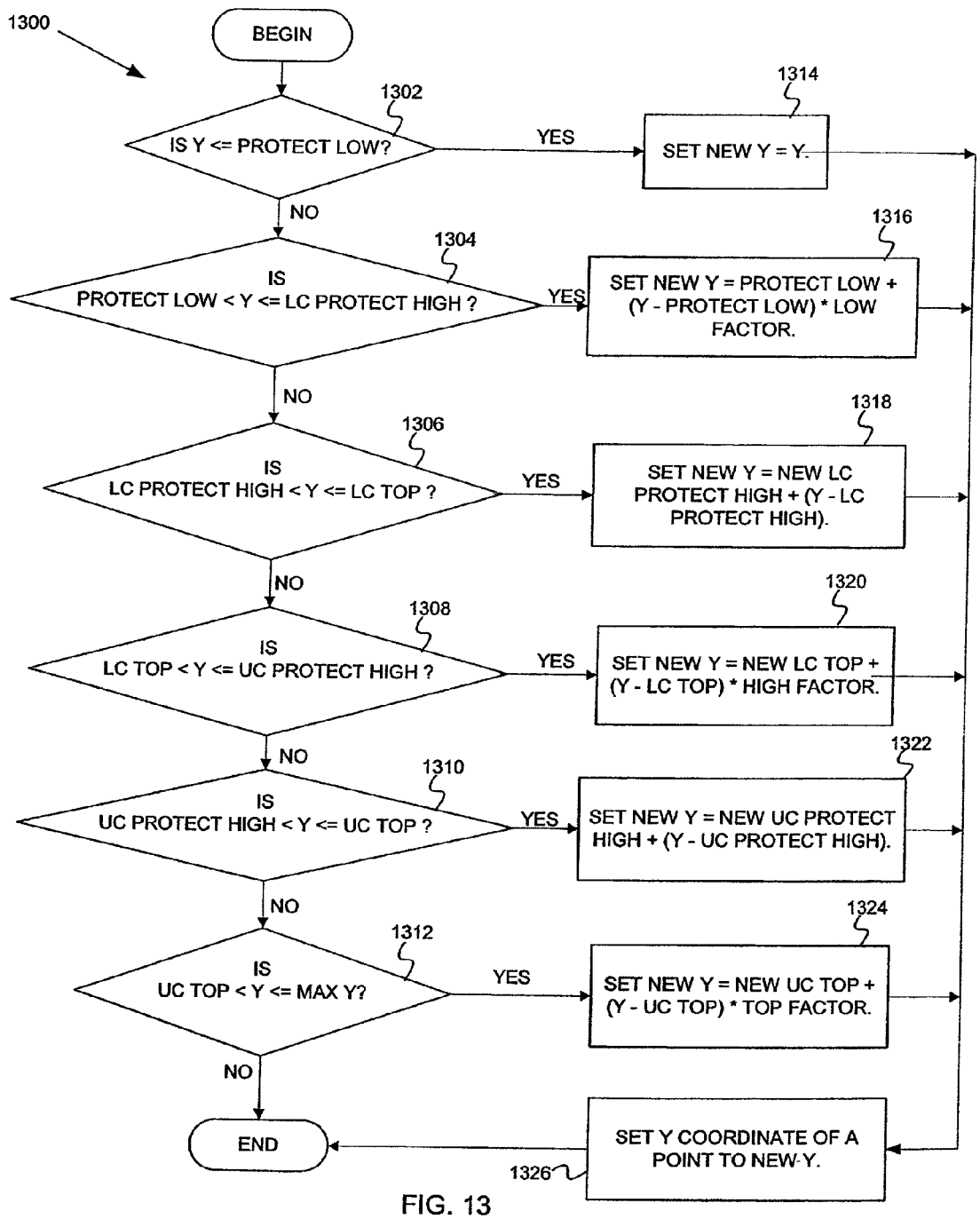
FIG. 13 is a more detailed flow diagram of the method of vertically repositioning character outline data, as shown in block 910 of FIG. 9, according to exemplary embodiments of the invention.

FIG. 13 is a flow diagram illustrating operations for vertically repositioning character outline data, according to exemplary embodiments of the invention. In one embodiment, the operations of flow 1300 are performed for each point in the character outline data. In an alternative embodiment, the operations of flow 1300 are performed for each point of a glyph. The flow diagram 1300 will be described with reference to the exemplary embodiment shown in FIG. 2. The flow diagram will also be described with reference to the interval boundaries, breakpoints, and intervals of FIG. 10 and the scaling factors of FIG. 12. The flow diagram 1300 commences at block 1302.

At block 1302, it is determined whether Y is less than or equal to Protect Low. In one embodiment, the character outline data includes a set of points, where each point is represented by a coordinate pair (x, y), in an x-y plane (see FIG. 10). For example, a point of the character outline data positioned on the y-axis 2 units above the x-axis is represented by the coordinate pair (0,2). In one embodiment, Y corresponds to the y coordinate in the (x, y) coordinate pair. If Y is less than or equal to Protect Low, the process continues at block 1314. Otherwise, the process continues at block 1304.

As shown at block 1314, New Y is set equal to Y. For example, the vertical repositioning unit 159 sets New Y equal to Y. From block 1314, the process continues at block 1326.

As shown in block 1304, it is determined whether Protect Low<Y<=LC Protect High. For example, the vertical repositioning unit 159 determines whether Protect Low<Y<=LC Protect High. If the condition is true, the process continues at block 1316. Otherwise, the process continues at block 1306.

At block 1316, New Y is set equal to Protect Low+(Y−Protect Low)*Low Factor. For example, the vertical repositioning unit 159 sets New Y to Protect Low+(Y−Protect Low)*Low Factor. From block 1316, the process continues at block 1326.

At block 1306, it is determined whether LC Protect High<Y<=LC Top. For example, the vertical repositioning unit 159 determines whether LC Protect High<Y<=LC Top. If the condition is true, the process continues at block 1318. Otherwise, the process continues at block 1308.

At block 1318, New Y is set equal to New LC Protect High+(Y−LC Protect High). For example, the rasterizer 160 sets New Y to New LC Protect High+(Y−LC Protect High). From block 1318, the process continues at block 1326.

At block 1308, it is determined whether LC Top<Y<=UC Protect High. For example, the vertical repositioning unit 159 determines whether LC Top<Y<=UC Protect High. If the condition is true, the process continues at block 1320. Otherwise, the process continues at block 1310.

At block 1320, New Y is set equal to New LC Top+(Y−LC Top)*High Factor. For example, the vertical repositioning unit 159 sets New Y to New LC Top+(Y−LC Top)*High Factor. From block 1320, the process continues at block 1326.

At block 1310, it is determined whether UC Protect High<Y<=UC Top. For example, the vertical repositioning unit 159 determines whether UC Protect High<Y<=UC Top. If the condition is true, the process continues at block 1322. Otherwise, the process continues at block 1312.

At block 1322, New Y is set equal to New UC Protect High+(Y−UC Protect High). For example, the vertical repositioning unit 159 sets New Y to New UC Protect High+(Y−UC Protect High). From block 1322, the process continues at block 1326.

As shown in block 1312, it is determined whether UC Top<Y<=Max Y. For example, the vertical repositioning unit 159 determines whether UC Top<Y<=Max Y. If the condition is true, the process continues at block 1324. Otherwise, the process ends.

At block 1324, New Y is set equal to New UC Top+(Y−UC Top)*Top Factor. For example the vertical repositioning unit 159 sets New Y to New UC Top+(Y−UC Top)*Top Factor. The process continues at block 1326.

At block 1326, the y coordinate of a point is set to New Y. For example, the rasterizer 160 set the y coordinate of a point to New Y. In one embodiment, the point is part of character outline data. In an alternative embodiment, the point is part of a glyph. From block 1326, the process ends.

Thus, a system and method for displaying text have been described. Although the present invention has been described with reference to specific exemplary embodiments, it will be evident that various modifications and changes may be made to these embodiments without departing from the broader spirit and scope of the invention. For example, in alternate embodiments, the system and methods described above are used for printing rather than displaying text. Accordingly, the specification and drawings are to be regarded in an illustrative rather than a restrictive sense.

The invention claimed is:

1. An article comprising:
a machine-readable memory that provides instructions, which when executed by a machine, cause the machine to perform operations including,
receiving character outline data comprising a set of points that define at least portions of a character;
determining original interval boundaries only on the y-axis based on the character outline data wherein the original interval boundaries correspond to original breakpoints that are represented by points on the y-axis relating to character outline data;
creating modified breakpoints and modified interval boundaries to correspond to pixel boundaries of a display, wherein each of the modified interval boundaries is a distance from one of the original interval boundaries and the modified interval boundaries are specified to bound intervals on the y-axis only; and
vertically repositioning certain points of the set of points of the character along pixel boundaries based on the distances using a stepwise transform relative to the y-axis, and on characteristics of a font, but without using hinting information, and wherein horizontal stems of the character maintain the same thickness through the transform.

2. The article of claim 1, wherein the font characteristics include a distance from a top of an uppercase character to a baseline.

3. The article of claim 1, wherein the font characteristics include a distance from a top of a lowercase character to a baseline.

4. The article of claim 1, wherein the instructions represent an operating system for the machine.

5. The article of claim 1, wherein the instructions represent a word processing program for the machine.

6. The article of claim 1, wherein the stepwise transform is a linear transform.

7. The article of claim 1, wherein the stepwise transform comprises at least one of a quadratic transform and a cubic transform.

8. An article comprising:
a machine readable memory that provides instructions, which when executed by a machine, cause the machine to perform operations comprising,
receiving character outline data comprising a set of points that define at least portions of a character, the portions including at least one horizontal stem,
determining original interval boundaries only on the y-axis based on the character outline data wherein the original interval boundaries correspond to original breakpoints that are represented by points on the y-axis relating to character outline data;
creating modified breakpoints and modified interval boundaries to correspond to pixel boundaries of a display, wherein each of the modified interval boundaries is a distance from one of the original interval boundaries and the modified interval boundaries are specified to bound intervals on the y-axis only; and
vertically repositioning certain points of the set of points of the character along pixel boundaries based on the distances using a stepwise linear transform relative to the y-axis, and on characteristics of a font, wherein hints are omitted from the font, and wherein the horizontal stem of the character maintains the same thickness across the transform.

9. The article of claim 8, wherein the instructions represent an operating system for the machine.

10. The article of claim 8, wherein the instructions represent an application program for the machine.

11. A method of rasterizing a font character on a display device, the method comprising:
receiving character outline data comprising a set of points that define at least portions of a character, the portions including at least one horizontal stem;
determining original interval boundaries only on the y-axis based on the character outline data wherein the original interval boundaries correspond to original breakpoints that are represented by points on the y-axis relating to character outline data;

using a processor to create modified breakpoints and modified interval boundaries to correspond to pixel boundaries of the display, wherein each of the modified interval boundaries is a distance from one of the original interval boundaries and the modified interval boundaries are specified to bound intervals on the y-axis only; and vertically repositioning certain points of the set of points of the character along pixel boundaries based on the distances using a stepwise transform relative to the y-axis, and on characteristics of a font, wherein hinting information is ignored when vertically repositioning portions of the character, and wherein the horizontal stem of the character has the same thickness before the transform as after the transform; and displaying the repositioned character on the display device.

12. A method of repositioning a character for a display, comprising:

receiving character outline data of the character, wherein the character outline data includes a set of points;

determining original interval boundaries only on the y axis based on the character outline data wherein the original interval boundaries correspond to original breakpoints that are represented by points on the y-axis relating to the character outline data:

using a processor to create modified breakpoints and modified interval boundaries to correspond to pixel boundaries of the display, wherein each of the modified interval boundaries is a distance from one of the original interval boundaries and the modified interval boundaries are specified to bound intervals on the y axis only; and vertically repositioning certain points of the set of points based on the distances using a stepwise transform relative to the y-axis, wherein horizontal stems of the character have the same thickness before the repositioning as after the repositioning.

13. The method of claim 12, wherein the stepwise transform is a linear transform.

14. The method of claim 12, wherein the stepwise transform comprises at least one of a quadratic transform and a cubic transform.

* * * * *

UNITED STATES PATENT AND TRADEMARK OFFICE
CERTIFICATE OF CORRECTION

| | | |
|---|---|---|
| PATENT NO. | : 7,940,272 B2 | Page 1 of 1 |
| APPLICATION NO. | : 11/620574 | |
| DATED | : May 10, 2011 | |
| INVENTOR(S) | : Mark Alan Zimmer | |

It is certified that error appears in the above-identified patent and that said Letters Patent is hereby corrected as shown below:

On the Title Page, in item (73), in Assignee, in column 1, line 1, delete "Cupterino" and insert -- Cupertino --, therefor.

In column 8, line 27, delete "they axis." and insert -- the y axis. --, therefor.

In column 12, line 30, in Claim 8, delete "machine readable" and insert -- machine-readable --, therefor.

In column 14, line 3, in Claim 12, delete "data:" and insert -- data; --, therefor.

Signed and Sealed this
Sixth Day of December, 2011

David J. Kappos
*Director of the United States Patent and Trademark Office*